United States Patent Office 3,291,502
Patented Dec. 13, 1966

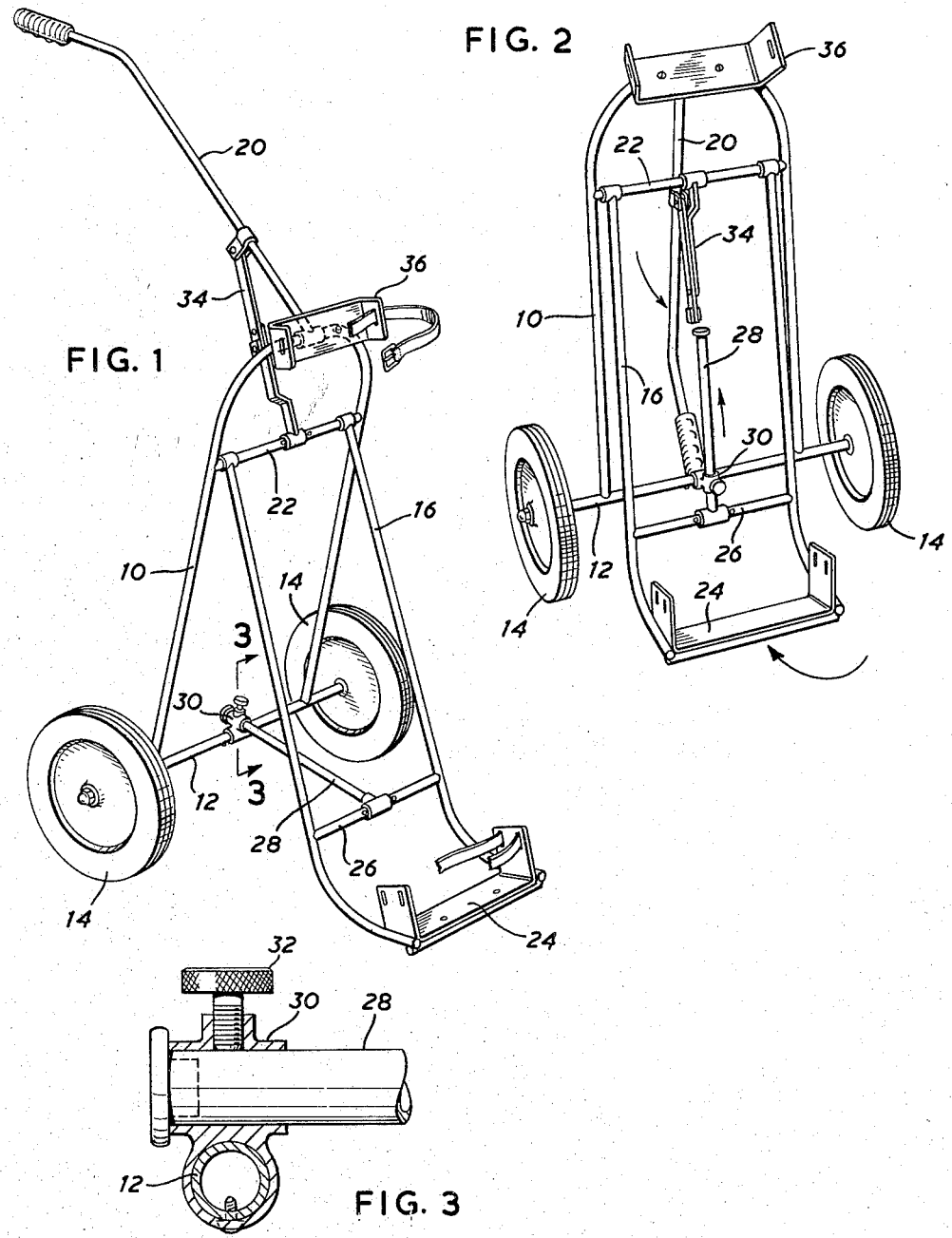

3,291,502
GOLF CARTS
Hugh O. England, London, Ontario, Canada, assignor to Hurok Manufacturing Limited, London, Ontario, Canada
Filed Mar. 11, 1965, Ser. No. 438,870
4 Claims. (Cl. 280—41)

This invention relates to the manufacture of golf carts and is particularly concerned with a golf cart construction characterised by simplicity, ruggedness and low cost.

As is generally well known, a "golf cart" is a small two-wheeled conveyance adapted to support a bag of golf clubs and to be pulled by a golfer or his caddy. Most golf carts now on the market are designed to be folded as compactly as possible for easy transportation in the trunk of an automobile. In the majority of the prior designs, the several folding operations required to close the cart include one in which the wheels are brought closely together. Experience with carts of this type has shown that the mechanisms required to permit the wheels to fold closely together considerably weaken the overall construction of the cart. This weakening is not justified by the benefits to be gained by bringing the wheels close together as the compactness of the folded unit is limited by the diameter of the wheels concerned. Further, it has been found that the mechanisms required to fold the wheels together have considerably increased the cost of manufacture of the prior carts and have made the folding operations unnecessarily complicated.

It is, therefore, an object of this invention to provide a folding golf cart which is simple, inexpensive to manufacture and rugged as compared to folding golf carts heretofore available.

It is a more specific object of the invention to provide a folding golf cart in which the folding operation required to collapse the cart does not include the step of bringing the wheels close together.

It is a still more specific object of the invention to provide a golf cart which can be folded to compact form by two simple folding operations.

The invention will be more thoroughly understood from the following description of a preferred embodiment thereof as read in conjunction with the accompanying drawings.

In the dawings,

FIG. 1 is a perspective view of a folding golf cart in accord with this preferred embodiment of the invention as shown in the unfolded or operative form;

FIG. 2 is a perspective view of the cart illustrated in FIG. 1 as shown in the folded form in ready condition for transportation; and FIG. 3 is an enlarged cross-sectional view taken along the line 3—3 of FIG. 1.

Referring to FIG. 1, the illustrated embodiment of the invention essentially consists of a main frame 10 carrying at its lower end an axle 12 having a pair of wheels 14 at its outer ends, a secondary frame 16 for supporting a golf bag, and a handle 20. The frame components and handle are conveniently made of tubular steel or aluminum. The wheels 14 are standard items fixed to the outer ends of axle 12 on bearings in a manner known heretofore.

Main frame 12 essentially consists of a U-shaped element fixed as by welding or the like at its lower ends to axle 12. A transverse bearing bar 22 is fixed to and extends between the arms of frame 10 adjacent the upper end thereof.

The golf bag supporting frame 16 essentially consists of two conveniently curved side frames which are fixed by pivotal connections to transverse bearing bar 22. At their free outer ends the side members of frame 16 carry a transverse platform 24, the construction of which is also known heretofore. It will be appreciated that it is the function of platform 24 to support the lower end of a golf bag. Platform 24 further supports the outer ends of frame 16 with additional support being gained by the transverse supporting bar 26.

Extending between bar 26 and axle 12, there is a locking rod 28. This member is pivotally connected to bar 26 and is slidingly received in a collar 30 which is pivotally connected to the axle 12 and carries a lock nut 32, the operation of which can best be seen in FIG. 3. Collar 30 is positioned on the axle so that its axle lies substantially at right angles with a plane which includes the longitudinal axis of the axle.

Handle 20 is pivotally connected to the upper end of main frame 10 and is further supported by a folding link bar 34 extending from the handle to a pivotal connection on the transverse bearing bar 22. Link 34 preferably acts on the toggle principle so that it normally locks the handle in the position shown in FIG. 1. The upper end of main frame 10 also carries a sling 36 adapted to receive and hold the upper end of a golf bag.

To lock the golf cart in the operative form shown in FIG. 1, it is only required to tighten nut 32 and to move link bar 34 past centre. In folding the cart to the form shown in FIG. 2, the user unlocks the link bar 34 to permit downward folding of handle 20 and releases lock nut 32 to permit rod 28 to move across the axle 12 so that frame 16 can be brought into a position generally parallel with main frame 10.

Due to its simplicity, the golf cart in accord with this invention is both rugged and inexpensive to manufacture. In its folded condition, it is as compact, for all intents and purposes, as the known folding carts which have the wheels close together in the folded position. The advantage of having the wheels close together is largely lost due to the fact that the folded cart cannot be stored in a space which is less deep than the diameter of the wheels. Thus, by avoiding the mechanisms required to bring the wheels close together, the cart in accord with this invention does not require a space of greater depth than the space required to store the known carts but it is considerably more rugged and less expensive than the known carts.

What I claim as my invention is:

1. A foldable golf cart comprising a main frame pivotally attached at its lower end to a transverse axle carrying wheels at its outer ends, a second frame pivotally attached at its upper end to said main frame and adapted to be folded into general parallelism therewith, sling means carried at the top of said first frame for supporting the upper end of a golf bag, a platform carried at the lower end of said second frame for supporting the lower end of a golf bag, a locking rod pivotally connected at one end to the second frame adjacent the lower end thereof, and slidingly and pivotally connected at its other end to said axle, and means releasably locking said lock rod against sliding movement relative to said axle.

2. A foldable golf cart as claimed in claim 1 further including a handle pivotally connected to the upper end of said main frame, and a folding linkage pivotally connected to said handle and to said main frame below the point of pivotal connection of said handle on said main frame.

3. A foldable golf cart as claimed in claim 2 in which said folding linkage is a toggle mechanism.

4. A foldable golf cart comprising a U-shaped main frame in which the arms of the frame are rigidly attached at their lower ends to an axle extending therebetween, said axle including lateral extensions carrying wheels at their outer ends, a transverse bearing bar extending between and rigidly attached to the arms of said main frame adjacent the upper ends thereof, a second frame consisting of a pair of spaced, parallel side frame members pivotally attached at their upper ends to said bearing bar, a transverse supporting bar extending between and fixed to said side frame members adjacent their lower ends, platform means, carried at the lower end of said second frame, for supporting the lower end of a golf bag, sling means carried at the upper end of said main frame for supporting the upper end of a golf bag, collar means pivotally attached to said axle at substantially the mid point thereof, with the axis of said collar means extending transversely with a plane including the axis of said axle, a locking rod pivotally attached at one end to said transverse supporting bar of said second frame and slidingly received in said collar means, lock nut means carried by said collar means for releasably locking said locking bar against sliding movement in said collar means; a handle pivotally fixed to the upper end of said main frame, and a toggle-like link bar pivotally connected at one end to said handle and pivotally connected at its other end to said transverse bearing bar of said main frame.

References Cited by the Examiner
UNITED STATES PATENTS

| | | | |
|---|---|---|---|
| 579,138 | 3/1897 | Danielson | 49—356 |
| 2,507,234 | 5/1950 | Vickery | 280—41 |
| 3,076,675 | 2/1963 | Lagace | 49—356 X |
| 3,165,330 | 1/1965 | Cotton. | |

BENJAMIN HERSH, *Primary Examiner.*

M. S. SALES, *Assistant Examiner.*